United States Patent [19]
Urban

[11] Patent Number: 5,094,384
[45] Date of Patent: Mar. 10, 1992

[54] RAPID RESPONSE SOLDERING STATION
[75] Inventor: Paul L. Urban, Cheraw, S.C.
[73] Assignee: Cooper Industries, Inc., Houston, Tex.
[21] Appl. No.: 745,887
[22] Filed: Aug. 16, 1991

Related U.S. Application Data
[62] Division of Ser. No. 442,219, Nov. 28, 1989, Pat. No. 5,062,564.

[51] Int. Cl.⁵ .............................................. B23K 3/03
[52] U.S. Cl. ................................ 228/177; 228/165; 228/173.1; 76/1
[58] Field of Search ............ 228/177, 165, 173.1, 228/51, 53, 55, 57; 76/1, 101.1, 119; 219/229, 241

[56] References Cited

U.S. PATENT DOCUMENTS

| | | | |
|---|---|---|---|
| 2,582,481 | 1/1952 | Dvorak et al. | 219/26 |
| 2,735,923 | 2/1956 | Juvinall | 219/26 |
| 2,747,074 | 5/1956 | Finch | 219/241 |
| 3,410,472 | 11/1968 | Weller et al. | 228/51 |
| 3,618,590 | 11/1971 | Yardley et al. | 219/241 |
| 3,654,427 | 4/1974 | Schoenwald | 219/241 |
| 3,899,654 | 8/1975 | Walton | 219/229 |
| 4,530,456 | 7/1985 | Mechelotti | 228/9 |
| 4,654,507 | 3/1987 | Hubbard et al. | 219/241 |
| 4,822,979 | 4/1989 | de Kam | 219/241 |
| 4,891,497 | 1/1990 | Yoshimura | 219/241 |

FOREIGN PATENT DOCUMENTS

| | | |
|---|---|---|
| 4035 | 3/1979 | European Pat. Off. |
| 315974 | 3/1989 | European Pat. Off. |
| 337065 | 10/1989 | European Pat. Off. |

OTHER PUBLICATIONS
Frederickson, M. D., *Electronic Manufacturing*, Sep. 1989, p. 26.

*Primary Examiner*—Samuel M. Heinrich
*Attorney, Agent, or Firm*—Kenyon & Kenyon

[57] ABSTRACT

A soldering tip is provided with a sensor to sense soldering tip temperature during a soldering cycle. The sensor is embedded in the soldering tip and positioned immediately adjacent to the tip's working surface. The sensor location provides rapid response to changing conditions at the tip's working surface. A microprocessor, responsive to the sensor, is provided to process the tip temperature data to control the power delivered to the heater which provides heat to the soldering tip. A visual and/or audio display also can be coupled to the processor. The microprocessor can be coupled to a further processor having long-term memory so that the collected data may be subsequently retrieve and displayed.

11 Claims, 5 Drawing Sheets

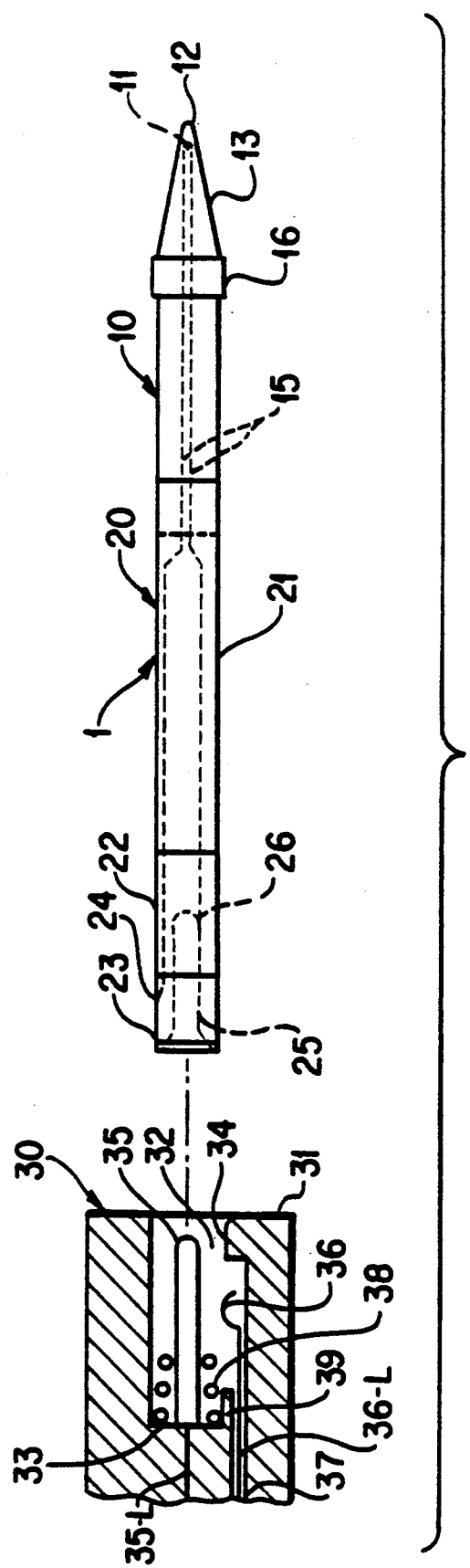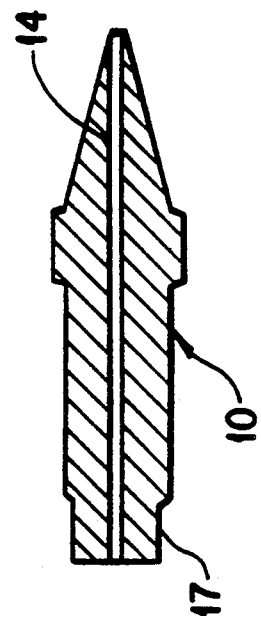
FIG.1
FIG.2

RAPID RESPONSE SOLDERING STATION

This application is a divisional of application Ser. No. 07/442,219, filed on Nov. 28, 1989, now U.S. Pat. No. 5,062,564.

TECHNICAL FIELD

The present invention relates to soldering generally, and more particularly to a soldering station having an improved soldering tip temperature sensing arrangement and processing circuitry responsive thereto.

BACKGROUND OF THE INVENTION

In manual conduction soldering, heat is conducted from the soldering tip to the soldering connection. That heat activates the flux, melts the soldering alloy so that it may wet the base metal and permits the distribution of the solder by capillary action.

The procedures selected to make the soldered joint should provide the proper soldering temperature, heat with the properties of the base metal and requirements of the finished product. Therefore, it is apparent that a stable soldering temperature contributes to the reliability of a soldered assembly and permits the production of a properly soldered assembly to be readily repeated. However, thermal losses occur at the soldering tip as the heat is absorbed by the connection. More specifically, the soldering tip temperature decreases during the soldering operation in accordance with the mass and thermal characteristics of the tip and connection as well as the thermal power capability of the soldering iron.

Attempts to vary the heat delivered to the soldering tip in accordance with tip loading have included electronically controlled soldering tools having sensors disposed in a location remote from the soldering tip's working surface. Among the drawbacks of these systems is their slow response to actual tip loading due to the remote sensor location. A slow response time will preclude the control device from immediately turning the heater on after the tip is loaded resulting in excessive tip temperature drop. Furthermore, the slow response time will preclude the control device from immediately turning the heater off after the tip is unloaded resulting in excessive tip temperature overshoot. Another drawback of these systems is the inability of the remotely positioned sensor to measure the actual tip temperatures, i.e., the temperature of the tip's working surface, which results in the collection of inaccurate, and possibly inconsistent temperature data. Furthermore, these problems are exacerbated under conditions where the tip is placed under a relatively light load.

Accordingly, there is a need to provide a heating system that would rapidly respond to these thermal losses to maintain a more constant soldering temperature.

The operator also contributes to temperature drop in manual conduction soldering, for example, by controlling the travel speed of the soldering tip along the connection. Thus, it is important to control operator techniques so that the operator spends consistent amounts of time during the connection interval for similar assemblies. Previous attempts to monitor the manual soldering process and gather information associated with heat transfer at the soldering connection also have included placing temperature sensors in the vicinity of the connection, i.e., spaced from the working surface of the soldering tip. However, among the drawbacks of these systems include distinguishing the data associated with certain soldering operations that make-up a cycle, i.e., distinguishing the time the operator spends soldering, cleaning the tip to remove oxides and solder therefrom (sponge wipe) and transporting the tip to a connection. It is particularly difficult to distinguish the data associated with the sponge wipe(s) from that associated with the soldering operation. This is due to the fact that the soldering tip temperature profile decays during both the sponge wipe and soldering operations. Thus, there is a need to develop a system that can collect tip temperature data and present the temperature-time profile therefor in a manner such that the data associated with each soldering operation can be readily distinguished.

SUMMARY OF THE INVENTION

The present invention is directed to a soldering tip assembly that avoids the problems and disadvantages of the prior art through the provision of a sensor which is placed within the soldering tip for sensing local temperature. The sensor is embedded immediately adjacent to the working surface of the soldering tip, i.e., the surface which contacts the soldering connection. With the sensor embedded in the soldering tip as close as possible to the working surface, rapid response to actual heat transfer dynamics may be achieved.

A processor e.g., a micropocessor coupled to this sensor arrangement to control the power delivered to the soldering tip rapidly responds to tip loading, and thus precisely controls tip temperature. Such temperature control permits the operator to consistently solder assemblies to specification or standard. The processor also can be used to store the temperature-time data for subsequent retrieval. This feature can be used for documentation.

A display can be coupled to the processor to monitor and/or record the tip temperature. For example, the temperature-time profile can be transmitted to a chart recorder or a video screen. Due to the rapid response characteristic of the sensor arrangement, the operator can use the display as a training tool. For example, when reviewing recorded tip temperature time data, each soldering operation can be distinguished. Furthermore, tip temperature fluctuations can be monitored almost exactly as they happen.

Another feature of the present invention is the provision of a spacer between the soldering tip and the contacts to which the sensor leads are coupled. As a result of this arrangement, the heat generated at the soldering tip is less likely to cause the contacts to oxidize.

A further feature of the present invention is the provision of good thermal contact between the sensor and the soldering tip. Such contact contributes to the accuracy of the collected tip temperature data.

BRIEF DESCRIPTION OF THE DRAWINGS

FIG. 1 is a side elevational view of the soldering tip sensor assembly together with a partial cross-sectional view of the receptacle therefor in accordance with the principles of the invention;

FIG. 2 is an enlarged, longitudinal cross-section of the soldering tip prior to the positioning of the sensor therein;

DETAILED DESCRIPTION OF THE PREFERRED EMBODIMENTS

Figure 3:
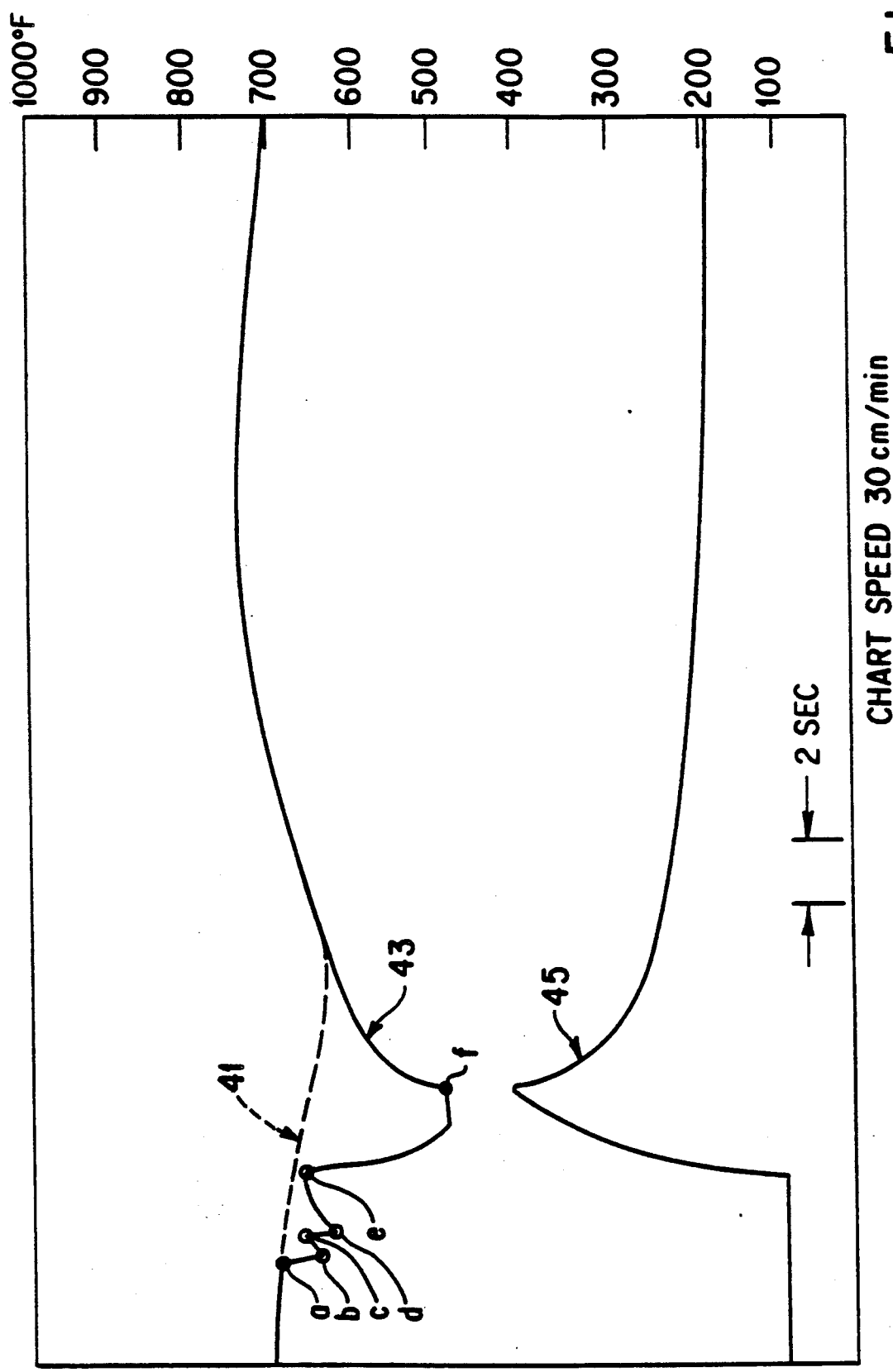
FIG. 3 is an example of a temperature-time plot illustrating response time.

Referring to the drawings in detail wherein like numerals indicate like elements, FIG. 1 shows the soldering tip-sensor assembly and receptacle therefor in accordance with the principles of the present invention, wherein soldering tip-sensor 1 comprises soldering tip 10 and coupling portion 20.

Soldering tip 10 includes thermal sensor 11 embedded immediately adjacent to working surface 12, i.e., the surface which actually contacts the soldering connection. Sensor 10 is placed a distance about 0 to 2.5 mm from working surface 12 of the soldering tip so that the sensed temperatures will essentially correspond to the actual temperatures at the soldering tip's working surface. However, in order to place sensor 10 within about 0 to 2.5 mm of the tip's working surface, the sensor diameter should be limited to a maximum of 0.5 mm. Due to this sizing requirement, a thermocouple is used for sensor 11. The interface between sensor 11 and soldering tip 10 must provide optimum heat transfer characteristics to enable the sensor to accurately pickup the working surface temperatures. Thus, the material used to join the sensor to the soldering tip must have a suitable thermal conductivity. The sensor to tip connection also should be made without developing air pockets between the sensor and the soldering tip. To this end, sensor 11 can be, for example, joined to soldering tip 10 with glass or ceramic material, or brazed thereto with silver solder. Alternately, soldering tip 10 may be swaged to suitably secure the sensor to the soldering tip. The sensor also may have a stainless steel jacket to improve thermal conductivity as well as the structural integrity of the thermocouple.

The sensor can be embedded in soldering tip 10 in accordance with the following procedures. The soldering tip, which is made from a material having high thermal conductivity such as copper, is provided with hole or bore 14 extending along the longitudinal axis of tip 10. This may be accomplished by machining the tip to form the hole therein or by starting with a piece of tubing such as 0.250 O.D. ×0.109 wall tubing. A pin is inserted in the hole of the prefabricated tip or of the tubing. Then it is translated therethrough to within about 2 to 2.5 mm of the other end of the hole. As the tip or tubing is swaged to collapse that 2 to 2.5 mm section of the hole, the pin prevents the remaining portion of the hole from collapsing. Then, the pin is removed. Alternatively, the last 2-2.5 mm of the hole may be plugged with a copper pin which is brazed to the tip with silver solder. The thermocouple, which preferably has a stainless steel jacket and a 0.020 inch O.D., is inserted in the hole and bonded to the collapsed or plugged portion of the hole with glass material, or it is ceramic or brazed thereto with silver solder to provide a suitable thermal connection between the thermocouple and the soldering tip. In lieu of such joining or bonding techniques, the tip can be swaged to securely connect the thermocouple to the tip.

Returning to FIG. 1, soldering tip 10 is illustrated with tapered section 13. This tip configuration optimizes heat transfer from the tip to the connection. However, it should be understood that other tip configurations may be used. Tip 10 may include collar 16 to couple the heater (not shown) to the soldering tip. Accordingly, collar 16 may, for example, be threaded. Tip 10 also is provided with annular recess 17 (FIG. 2) for receiving coupling portion 20 which couples soldering tip 10 to receptacle 30.

Coupling portion 20 comprises tubular extension 21, tubular insulator 22 and contact ring 23. Soldering tip 10 is press-fit into one end of extension 21 via annular recess 17. The other end of extension 21 also can be provided with an annular recess (not shown) so that it may be press-fit into tubular insulator 22 which can be coupled to contact ring 23 through a similar connection (not shown). However, other coupling mechanisms may be used to couple the soldering tip, extension, insulator and contact ring together.

Referring to FIGS. 1 and 2, sensing leads 15 extend from sensor 11 to the other end of tip-sensor assembly 1 through hole 14, which is provided in tip 10, and then through coupling portion 20. One of the leads is connected to outside contact ring 23 at contact point 24 while the other lead is connected to inside contact 25 at contact point 26. As can be understood while viewing FIG. 1, inside contact 25 extends into the end of tip-sensor assembly 1 opposite working surface 12. Inside contact 25 is in the form of a sleeve, socket or female connector. To prevent short-circuiting between contact ring 23 together with its associated lead and inside contact 25 together with its associated lead, insulation (not shown) is provided therebetween.

Extension 21 spaces sensor contacts 23–26, as well as receptacle contacts 34, 36 (described below), from heat generated in the vicinity of the soldering tip. This arrangement prevents these contacts from being subjected to elevated soldering temperatures which otherwise would rapidly oxidize these contacts. Such oxidation reduces conductivity between contacts and eventually may lead to circuit failure. The contacts also may be gold plated to further protect them against oxidation.

Extension 21 not only spaces the soldering tip from the sensor contacts, but also supports the soldering tip at one end of coupling portion 20. Thus, extension 21 must have good mechanical properties, e.g., strength, under elevated temperatures. Accordingly, extension 21 should be made from material that can meet these requirements such as stainless steel or brass. It follows that coupling portion 20 is provided with insulator 22 to electrically insulate contacts 23–26 from extension 21.

The receptacle which is coupled to the handle of the soldering iron, and which receives soldering tip-sensor assembly 1 is generally designated with reference numeral 30. Receptacle 30 comprises housing 31 which has opening 32 formed therein. The opening is sized to receive one end of coupling portion 20. Within opening 32, inside contact 35 extends from wall 33 of housing 31. Inside contact 35 is in the form of a prong so that it may be inserted into inside contact 25 which is in the form of a socket. Outside contact 36 has a convex surface which extends radially within opening 32 so that it engages with the outer surface of outside contact ring 23 when ring 23 is inserted into opening 32. However, to avoid axial deformation of outside contact 36, housing 31 is provided with lip 34 which extends radially inwardly slightly less than outside contact 36. Thus, as coupling portion 20 is inserted into opening 32, lip 34 guides contact ring 23 toward the top of the convex portion of outside contact 36. As a result, contact ring 32 slides over outside contact 36 without axially deforming the same. Lead 35-L extends from inside contact 35 and lead 36-L extends from outside contact 36 through passageway 37. These leads couple the sensor to a microprocessor or other control, storage or display circuitry described below.

After tip-sensor assembly 1 is inserted through an opening in the heater (not shown), and then into opening 32 of receptacle 30, a conventional tension-nut assembly can be used to lock coupling portion 20 in the receptacle.

Coil spring 38 is provided to urge coupling portion 20 away from receptacle 30 when removing coupling portion 30 from the receptacle. To this end, coil spring 38 is seated in opening 32 about inside contact 35. When the coil spring is included, housing 31 further includes projection 39 which, as can be understood from the drawings, is positioned to maintain spring 38 centered about inside contact 35. Projection 39 is made from a material that enables it to electrically insulate outside contact 36 from coil spring 38.

Figure 4:
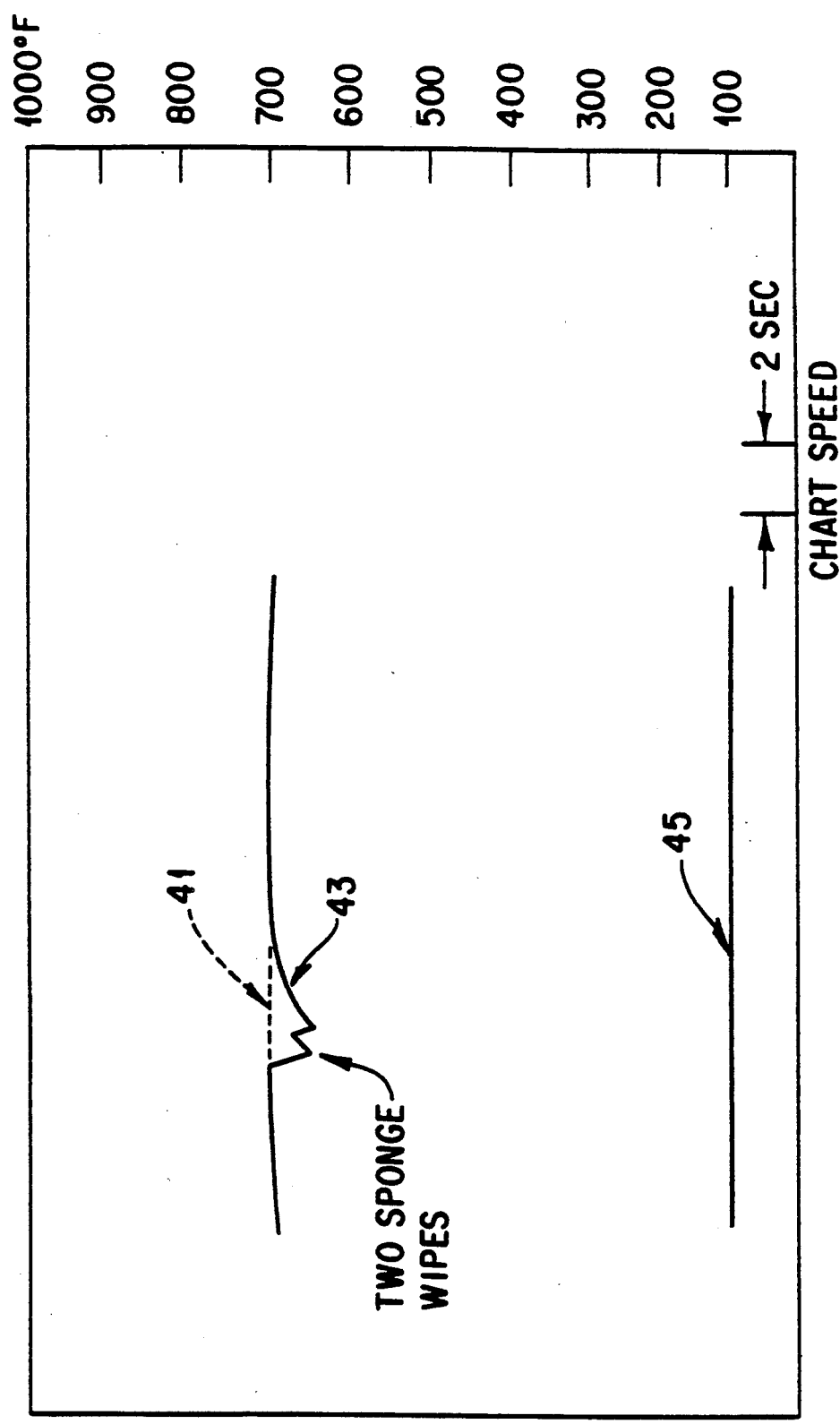
FIG. 4 is an example of a temperature-time plot graphically illustrating two sponge wipes.

FIGS. 3 and 4 illustrate the effect of the thermal sensor location on the temperature profile. Referring to FIG. 3, the dashed line, designated with reference numeral 41, represents a temperature-time plot over a soldering cycle based on information received by a sensor remotely positioned from the working surface of a soldering tip, i.e., 0.375 inches from the working surface. In contradistinction, solid line 43 represents a temperature-time plot of the soldering cycle based on information received by a sensor positioned at the working surface of the soldering tip. When comparing these temperature profiles with line 45, which represents the actual temperature of the soldering connection that in this example happens to be copper, it can be understood that unlike the sensor arrangement which senses the information depicted by line 41, the sensor positioned at the tip's working surface rapidly responds to tip loading. Furthermore, the distinct curves along line 43 permits the intervals which reflect specific soldering operations to be easily discriminated. More specifically, intervals a-b, c-d, d-e and e-f represent a sponge wipe in one direction along the tip, a sponge wipe in another direction along the tip, transporting the tip to the connection and soldering. However, line 41 illustrates that a remote sensor provides information that virtually does not differentiate these intervals. Thus, it can be understood that a sensor placed at the tip's working surface or immediately adjacent thereto provides information which, when transmitted to control circuitry permits that circuitry to rapidly respond to tip loading and to actuate or deactuate the soldering tip heater accordingly. Such a sensor arrangement also permits display and storage of the actual time that the operator spends during each soldering operation together with corresponding tip temperatures.

Figure 5:
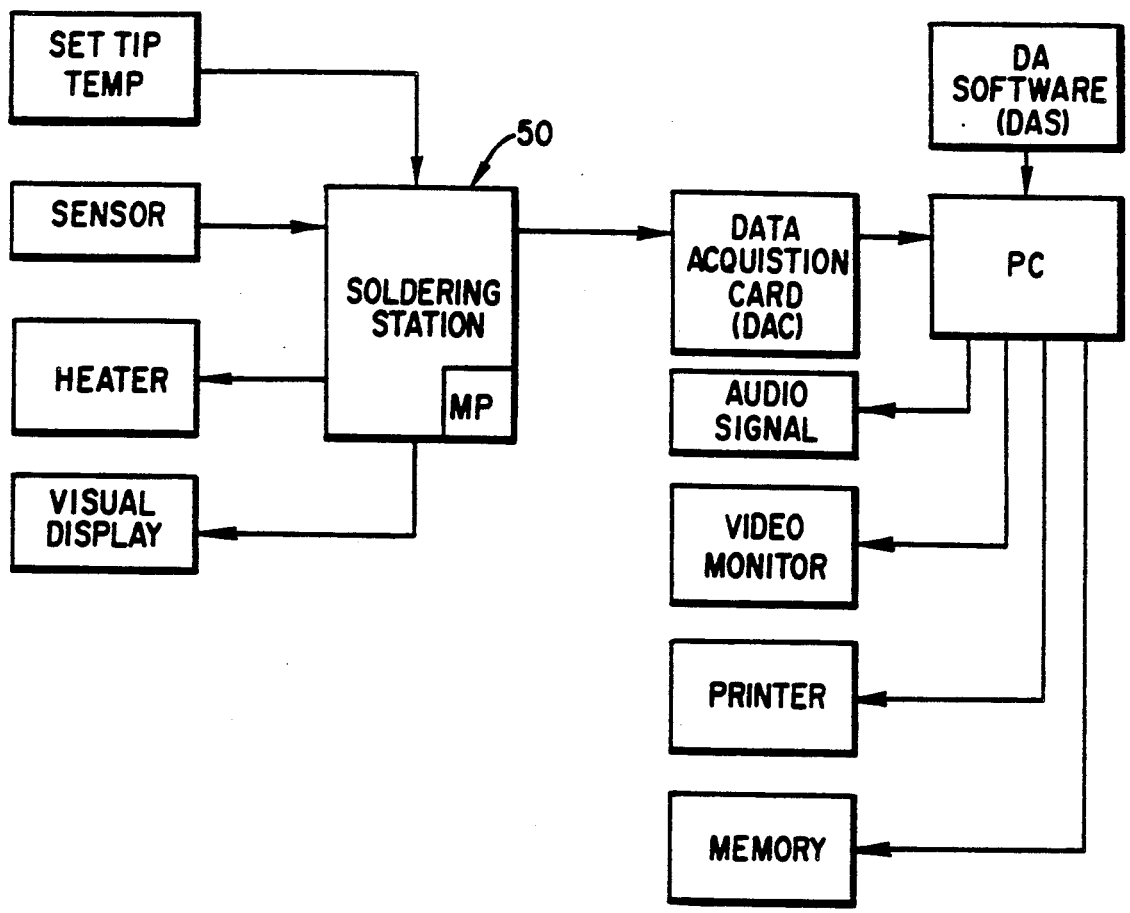
FIG. 5 is a schematic diagram illustrating the control, display and storage capacity of the soldering station.

FIG. 5 diagramatically represents the soldering station control, display and data storage arrangement. The soldering station comprises a soldering iron having a heater coupled to the soldering tip (not shown) and a control circuit such as a microprocessor MP. First, a predetermined soldering tip temperature is input into soldering station 50. Throughout the soldering cycle, the sensor, e.g., the thermocouple, embedded in the soldering tip, senses the tip temperature and sends a signal, which corresponds to the sensed temperature, to microprocessor MP. Microprocessor MP then compares the predetermined and sensed temperature values and increases the power delivered to the heater, which preferably is a resistor, when the difference between the sensed and predetermined values is below a lower limit. On the other hand, microprocessor MP decreases the power delivered to the heater when the difference between the sensed and predetermined values is above an upper limit.

Microprocessor MP also processes the sensor's signal to be visually displayed, for example, on a chart recorder or video screen. Thus, the system can provide instant feedback to the operator while soldering. Microprocessor MP also can send a signal to a devise to produce an audio signal to indicate to the operator that the soldering tip temperature is beyond the predetermined range. Furthermore, microprocessor MP can superimpose the sensed tip temperature excursion over an ideal temperature excursion for the size of the load and tip style. This information can be displayed further to assist in operator training.

The data acquisition card DAC provides an interface buffer between the soldering station microprocessor and another processor such as personal computer PC. More specifically, data acquisition card DAC receives and/or formats information received from the soldering station microprocessor for subsequent use by another processor, such as personal computer PC. The data acquisition software DAS is provided to the PC to process the information received from the DAC for display or for putting that information into long-term memory. The data acquisition software DAS also can be used with the PC to retrieve and display any information put in memory. Various modes of display include audio signals which indicate tip temperatures above or below preselected boundaries, and visual displays, such as video screens or monitors, or printers.

Figure 6:
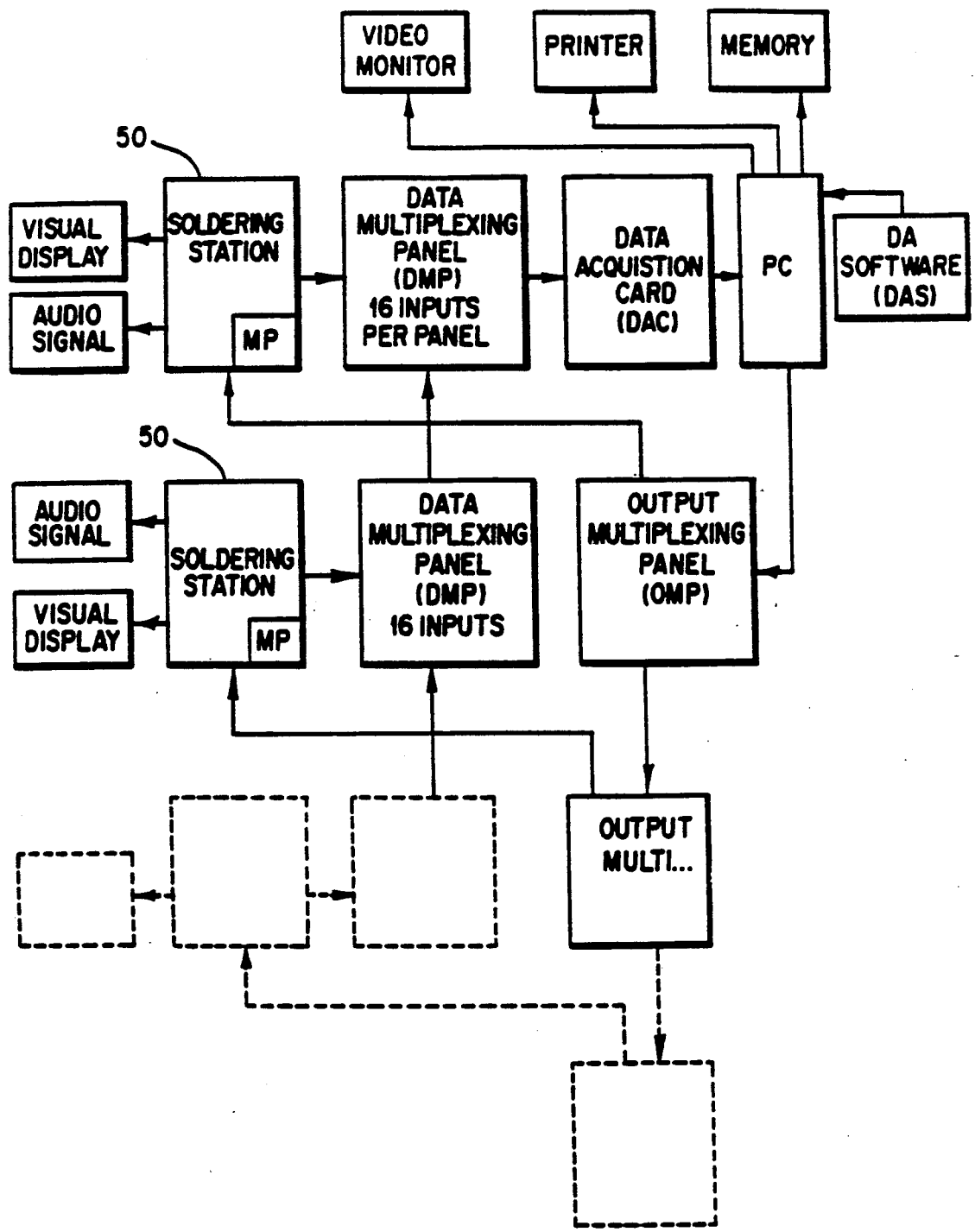
FIG. 6 is a schematic diagram illustrating a number of soldering stations integrated for a production system.

FIG. 6 diagramatically represents a number of soldering stations integrated for production. As evident from FIG. 6, a large number of soldering stations 50 each having a microprocessor MP, can be coupled to a central PC via separate data and output multiplexing panels DMP, OMP. For example, each DMP can be designed to handle up to 16 soldering station inputs, with the maximum number of inputs or stations being 256. Data is stored in a respective soldering station microprocessor until central PC is ready to process that data. The PC program downloads that data clears that station temporary memory, processes that data and stores or displays it. The program sequentially proceeds to each station repeating the above steps. Furthermore, if central PC goes down, each satellite soldering station's microprocessor can continue to display or store the sensed information, or control tip temperature in response thereto.

I claim:

1. A method of making a soldering tip comprising the steps of:
   providing a thermally conductive member having a hole extending therethrough;
   inserting a retainer into one end of the hole;
   closing the other end of the hole;
   removing the retainer;
   positioning a thermal sensor in the hold against the closed end thereof; and
   fixing the sensor in position.

2. The method of claim 1 wherein said closing step comprises closing about 0.1 to 2.5 mm of said other end of the hole.

3. The method of claim 1 wherein said closing step comprises collapsing the inner walls of said hole.

4. The method of claim 3 wherein said collapsing step comprises swaging the thermally conductive member.

5. The method of claim 1 wherein closing step comprises plugging said other end of the hole with an insert and brazing said insert to said thermally conductive member with silver solder.

6. The method of claim 1 wherein said fixing step comprises joining the sensor to said thermally conductive member with glass.

7. The method of claim 1 wherein said fixing step comprises joining said sensor to said thermally conductive member with ceramic material.

8. The method of claim 1 wherein said fixing step comprises brazing said sensor to said thermally conductive member with silver solder.

9. The method of claim 8 wherein said positioning step comprises positioning a thermocouple against said closed end of the hole.

10. The method of claim 8 wherein said positioning step comprises positioning a stainless steel jacketed thermocouple against said closed end of the hole.

11. The method of claim 1 wherein said positioning step comprises positioning a thermocouple against said closed end of said hole.

* * * * *